United States Patent Office

2,915,526
Patented Dec. 1, 1959

2,915,526

ALDEHYDE ADDUCTS OF 2-AMINO-5-NITROTHIAZOLE

William Oroshnik, Plainfield, N.J., assignor to Ortho Pharmaceutical Corporation, a corporation of New Jersey No Drawing. Application March 31, 1958
Serial No. 724,827

5 Claims. (Cl. 260—306.8)

This invention relates to new organic compounds. More particularly, it relates to aldehyde adducts of 2-amino-5-nitrothiazole having the formula

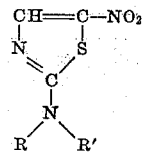

in which R is a substituent selected from the group consisting of hydrogen and hydroxymethyl radicals, and R' is selected from the group consisting of hydroxymethyl, α-hydroxyethyl and α-hydroxypropyl radicals.

The compounds of this invention are useful as antifungal and antiprotozoan agents. More particularly, the compounds claimed are effective against *Histomonas meleagridis, Trichomonas vaginalis, Trichomonas foetus* and *Candida albicans. Histomonas meleagridis* is the protozoan organism responsible for one of the most destructive diseases in turkey husbandry, enterohepatitis, often referred to as ""blackhead.""

*Trichomonas foetus* causes abortion in cattle. The compounds of this invention are useful in veterinary medicine and are intermediates in the preparation of other derivatives of 2-amino-5-nitrothiazole.

It is an object of the present invention to provide novel compounds effective against protozoal infections.

Another object of this invention is to produce α-hydroxymethyl derivatives of 2-amino-5-nitrothiazole.

The new compounds are prepared according to the following general reaction scheme.

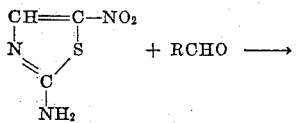 + RCHO ⟶

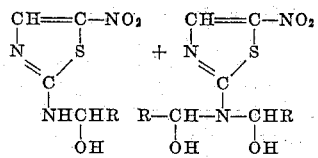

wherein R represents a hydrogen, methyl or ethyl group. The compounds of the present invention are prepared by stirring a mixture of 2-amino-5-nitrothiazole with an excess of the aldehyde at about 20° C., to 90° C. Under these conditions, the adduct is formed in about five hours at room temperature; at higher temperatures, less than one hour may be sufficient. The reaction mixture containing the adduct is allowed to stand at low temperatures (about 0° C.) to cause crystallization of the product. The crystalline product may be isolated by filtration and air dried.

When an excess of aqueous formaldehyde is present, a high yield of the di-methylol adduct is obtained. A mixture of the mono- and di-methylol adduct is formed if the amount of formaldehyde is reduced.

With alkyl aldehydes such as acetaldehyde and propionaldehyde, the product is a mono-adduct accompanied by small amounts of the di-adducts.

With an aryl aldehyde such as benzaldehyde, 2-amino-5-nitrothiazole reacts less readily than with formaldehyde and the reaction product is a mixture of the starting thiazole and the mono-adduct.

The 2-amino-5-nitrothiazole reacts with acrolein to form a red polymer of high molecular weight, and with chlorol to form a mixture of products from which no pure substance has been isolated.

The following examples are illustrative of the invention. All temperatures are expressed in degrees centigrade.

EXAMPLE I

*2-dimethylolamino-5-nitrothiazole*

A suspension of 50 grams (0.345 mole) of 2-amino-5-nitrothiazole is vigorously stirred at 90° C., while 450 milliliters of 37% aqueous formaldehyde is added in one portion. This cools the reaction mixture to 70° C., and it is stirred at this temperature until all of the yellow solid dissolves. Then the yellow solution is cooled to 45° C., and filtered, and the filtrate is stored at 0° C. for three days to cause crystallization of the product. The product is filtered off and dried in air. The yield of 2-dimethylolamino-5-nitrothiazole is 62.4 grams (88%); pale yellow prisms which melt at 120–125° C., (on a preheated block) with evolution of formaldehyde.

*Analysis.*—Calcd. for $C_5H_7N_3O_4S$: C 29.23 H 3.44. Found: C 29.10 H 3.50.

EXAMPLE II

*2-(α-hydroxyethyl)amino-5-nitrothiazole*

A mixture of 30 grams (0.207 mole) of 2-amino-5-nitrothiazole and 270 milliliters of freshly distilled acetaldehyde is stirred vigorously at 20° C., for three hours and then the resulting pasty mixture is stored at 10° C., for two hours. The mixture is filtered and the filter cake is washed with dry ethyl ether and then dried in air to give 24.5 grams (62.5%) of 2-(α-hydroxyethyl)amino-5-nitrothiazole as pale yellow prisms which melt at 110–115° C. (preheated block), with evolution of acetaldehyde.

*Analysis.*—Calcd. for $C_5H_7N_3O_3S$: C 31.72 H 3.73. Found: C 32.08 H 3.96.

EXAMPLE III

*2-(α-hydroxypropyl)amino-5-nitrothiazole*

A mixture of 25 grams (0.172 mole) of 2-amino-5-nitrothiazole and 125 milliliters of freshly distilled propionaldehyde is stirred vigorously at 25° C., for five hours, and then stored at 0° C., for fourteen hours. Filtration of the paste and washing of the filter cake with ether followed by drying in air gives 27.5 grams (80%) of pale yellow granules of 2-(α-hydroxypropyl)-amino-5-nitrothiazole. This melts at 95–105° C. (preheated block), with evolution of propionaldehyde.

*Analysis.*—Calcd. for $C_6H_9N_3O_3S$: C 35.43 H 4.46. Found: C 35.73 H 4.46.

The in vitro trichmonadicidal activity of 2-acylamino-5-nitrothiazoles has been demonstrated by a series of tests which established the minimal inhibitory concentration of these compounds. Minimal inhibitory concentration, as used above, is defined as the minimal concentration of a trichomonadicidal compound capable of preventing the growth of, as well as the killing of *Trichomonas foetus* organisms introduced into a culture medium, capable alone of supporting a vigorous growth of the organisms, and containing the trichomonadicidal compound to be tested."

In making the test to determine minimal inhibitory concentrations, a glucose tryptone agar growth media is prepared and 10 cubic centimeters of this growth media is added to petri dishes containing increasing amounts of the compound to be tested. The series of petri dishes are sterilized and each dish is inoculated by streaking with a suspension of *Trichomonas foetus*. After inoculation, the series of petri dishes are incubated for 72 hours at 32° C., and examined for growth. The minimal inhibitory concentration of the compound to be tested is that concentration in the petri dish in which no viable organisms are observed after 72 hours. If growth is visible upon the surface of the glucose tryptone agar media at the time of examination, the concentration of the aldehyde adduct in that petri dish is less than minimal. The results of these tests appear in columns 1 and 2 of Table I and the concentration of the aldehyde adduct in the glucose tryptone agar media is expressed in parts per million.

TABLE I

|  | *Trichomonas foetus* In vitro | | *Trichomonas foetus* In vivo; mouse | | |
|---|---|---|---|---|---|
|  | Act., Parts per Million | Inact., Parts per Million | $LD_{50}$, mgm./kg. | $PD_{50}$, mgm./kg. | Therapeutic Index |
| 2-Methylolamino-5-nitrothiazole | 10 | 2 | 900 | 142 | 6 |
| 2-Dimethylolamino-5-nitrothiazole | 5 | 1 | 1,000 | 343 | 3 |
| 2-(α-Hydroxyethyl)-amino-5-nitrothiazole | 10 | 4 | 555 | 365 | 1.5 |
| 2-(α-Hydroxypropyl)-amino-5-nitrothiazole | 10 | 4 | 525 | 380 | 1.3 |

The toxicity of the compounds of the present invention are determined by oral administration to mice and may be determined from the data appearing in column 3 of Table I. In column 3, under the heading $LD_{50}$ is indicated the quantity (in milligrams per kilogram of body weight) which is fatal to 50% of the mice tested. The amount (in milligrams per kilogram of body weight) required to cure 50% of the test animals injected with a lethal dose of *Trichomonas foetus* is indicated in column 3 under the heading $PD_{50}$. Column 4 of Table I reports the therapeutic index of these compounds.

In employing the trichomonadicides in the present invention for the treatment of *Trichomonas foetus* one or more of the active agents are uniformly distributed in a suitable chemotherapeutic vehicle that is chemically compatible with the particular trichomonadicide selected, non-inhibiting with respect to the action of the effective agent upon *Trichomonas foetus* and essentially non-injurious to the vaginal mucosa under the conditions of use. The vehicle is preferably of a liquid or semi-liquid type. Furthermore, since the final preparation should be readily miscible with vaginal fluids, the vehicles, whether hydrous or anhydrous, are preferably water-miscible or water-dispersible. The compositions of this invention may be in the form of suppositories, if desired.

The foregoing criteria for a vehicle in which 2-amino-5-nitrothiazole is incorporated may be met by a large number of semi-liquid chemotherapeutic vehicles that are well known in the art. Thus, for example, the vehicle may comprise semi-liquids that are colloidal in nature, especially those that are viscous and/or mucilaginous in character. Such vehicles are particularly suitable for use in topical treatment of *Trichomonas foetus* because of their inherent gelatinous and miscible nature which affords prolonged contact between the aldehyde adduct of 2-amino-5-nitrothiazole and the infecting organism.

In order to disclose more clearly the manner of formulating the compounds of the present invention to topical application, several specific examples will hereinafter be described in considerable detail.

EXAMPLE IV

| | |
|---|---|
| Deionized water | 75.80 |
| Sodium carboxymethylcellulose | 3.00 |
| Polyethyleneglycol (molecular weight approximately 4000) | 15.00 |
| Propylene glycol | 5.00 |
| Para-hydroxy-benzoic acid methyl ester | 0.20 |
| 2-dimethylolamino-5-nitrothiazole | 1.00 |

EXAMPLE V

| | |
|---|---|
| Deionized water | 90.30 |
| Methyl cellulose | 3.50 |
| Glycerin | 5.00 |
| Para-hydroxy-benzoic acid methyl ester | 0.20 |
| 2-(α-hydroxyethyl)amino-5-nitrothiazole | 1.00 |

EXAMPLE VI

| | |
|---|---|
| Deionized water | 80.80 |
| Pectin | 8.00 |
| Propylene glycol | 10.00 |
| Para-hydroxy-benzoic acid methyl ester | 0.10 |
| Para-hydroxy-benzoic acid propyl ester | 0.10 |
| 2-(α-hydroxypropyl)amino-5-nitrothiazole | 1.00 |

The trichomonadicidal formulations of Examples IV through VI are prepared according to the following general procedure in which two initial solutions are mixed to make the formulation, all the parts being given by weight. To prepare solution A, dissolve the para-hydroxy-benzoic acid in about two-thirds of the hot deionized water, cool to about 170° F., and, while stirring, add the gel-forming ingredient and glycerine or propylene glycol. To prepare solution B, add the trichomonadicidal agent to the remainder of the deionized water. The pH is adjusted to the desired value. The formulation is prepared by adding solution B to solution A in a slow stream with good stirring; stirring is continued for at least one hour.

Compositions as described in Examples IV through VI are preferably applied to the vagina by means of a vaginal applicator of sufficient length that the formulation may be placed evenly from the posterior fornix to the introitus.

The compounds of the present invention have also been found to be effective against enterohepatitis (blackhead) when administered by admixture, suspension, or dispersion in the food and/or drink normally partaken by turkeys, such as grain, mash, scratch, water or other liquids.

The general range of concentration of the aldehyde adduct in the total substance is from about 0.05% or less to about 1%. The optimal concentration for effective therapy is in the range from about 0.05% to about 0.2% of the total food or drinking water. With these optimal concentrations, the daily drug intake for infected birds varies from about 25 milligrams of drug per kilogram of body weight to about 400 milligrams of drug per kilogram of body weight. In general, the precise dosage depends on the particular compound and the severity of the infection. The compound, when administered in the concentrations indicated above, shows little toxic effects.

Various changes and modifications of the invention may be made and to the extent that such variations incorporate the spirit of this invention, they are intended to be included within the scope of the appended claims.

What is claimed is:
1. A compound having the formula

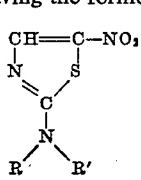

in which R is a substituent selected from the group consisting of hydrogen and hydroxy methyl radicals and R' is selected from the group consisting of hydroxy methyl, α-hydroxyethyl and α-hydroxypropyl groups.

2. A compound having the formula

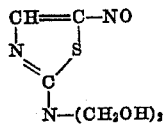

3. A compound having the formula

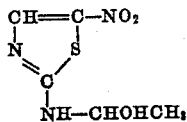

4. A compound having the formula

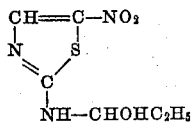

5. A method of producing an α-hydroxyalkyl-2-amino-5-nitrothiazole which comprises agitating a mixture of 2-amino-5-nitrothiazole with an excess of an aldehyde.

References Cited in the file of this patent

UNITED STATES PATENTS

| | | |
|---|---|---|
| 2,531,756 | Waletzky et al. | Nov. 28, 1950 |
| 2,547,677 | Waletzky et al. | Apr. 3, 1951 |
| 2,573,657 | Steahly | Oct. 30, 1951 |
| 2,574,155 | Parker et al. | Nov. 6, 1951 |
| 2,631,963 | Parker et al. | Mar. 17, 1953 |
| 2,755,285 | O'Neill et al. | July 17, 1956 |